INVENTOR
Clifton B. Vann, III

United States Patent Office 3,434,602
Patented Mar. 25, 1969

3,434,602
PALLET LOADING MACHINE FOR SEQUENTIALLY DELIVERED ARTICLES
Clifton B. Vann III, Charleston, S.C., assignor to West Virginia Pulp and Paper Company, New York, N.Y., a corporation of Delaware
Filed Apr. 15, 1966, Ser. No. 542,923
Int. Cl. B65g 57/08
U.S. Cl. 214—1          3 Claims

ABSTRACT OF THE DISCLOSURE

An article transfer machine which accumulates sequentially delivered articles in a row on a tiltable horizontal platform, tilts the platform transversely to the row of articles so that they are lined up against a dump side barrier which becomes a bottom support when the platform is almost fully tilted, and removes the dump side barrier by interaction with a cam when tilting is substantially complete, so that the articles drop in a row upon an article-receiving means which may be a pallet on a selectively shiftable dolly whereby the pallet may be sequentially loaded, row by row.

---

This invention relates to article transfer machines for sequentially delivered articles. It particularly relates to machines that accumulate sequentially delivered articles in rows and sequentially upend and transfer the rows of articles to another location or workplace. It specifically relates to machines that accumulate incoming articles in rows and sequentially load the rows of articles in a juxtaposed relationship onto a pallet.

This invention is a machine that: (1) accumulates a sequential flow of incoming articles in a row on a tiltable platform, (2) tilts the platform transversely to the row of articles so that the articles are lined up against a dump side barrier which becomes a bottom support for the articles when the platform is almost fully tilted, and (3) removes the dump side barrier by interaction with a cam when tilting is substantially complete, so that the upended articles drop in a row upon an article receiving means. In the embodiment herein described, the article-receiving means is a dolly which supports a pallet. This dolly is selectively shuttled back and forth so that the rows of articles may be closely juxtaposed until the pallet is fully loaded.

Machines in the prior art, with generally more complex structure, perform some of these functions. For example, U.S. 2,623,652 dumps empty boxes transversely with trip element 26 and conveyors 40, 55, 80. U.S. 2,901,136 has a tilting table B for successively raising boxes. U.S. 3,203,560 has means for tilting carriage grill 52 in order to automatically discharge a stack from elevator 50. U.S. 3,172,547 describes a machine for collecting single-conveyed articles to form a row, moving the row sidewise, assembling rows to form a load group tier, and stacking the tiers.

The instant invention accomplishes the article-handling tasks of accumulating, aligning into a row, upending and transferring as a row, and loading onto a pallet, as in the described embodiment. If a multi-layer loading means is provided for sequentially depressing the pallet by the height of the dropped articles, it is possible to load a pallet with multiple layers of relatively small articles, such as cans, small boxes, etc., that can be upended during transfer to the pallet. Alternatively, the article-receiving means could be a smooth floor, a chute, a conveyor belt, or a separate machine for additional treatment of the upended articles. Thus the machine could be useful if it did not include an article-receiving means.

In the paper industry, small rolls of tightly wound paper, termed counter rolls, are frequently handled by hand. These counter rolls may be as small as 9 inches in diameter and 12 inches in length. They may be as large as 20 inches in diameter and 80 inches in length, weighing up to 300 pounds. For warehouse transportation and storage, these counter rolls are most conveniently stacked endwise on wooden pallets and strapped together with plastic tape to create a stable load.

The preferred embodiment that is herein described is illustrated in the drawings, as follows:

FIGURE 6 is a cross-section in elevation of the rail means that guides and supports the dolly, looking in the direction of the arrows crossing the line in FIGURE 3.

FIGURE 7 is a side detail view of the tilting limit means on the side that is visible in FIGURE 4, with the tiltable platform in horizontal position.

FIGURE 8 is a side detail view of the tilting limit means, similar to FIGURE 7, with the tiltable platform nearly fully elevated.

FIGURE 9 is a perspective detail view of the barrier roll movement means that is on one side of the tiltable platform.

Figure 1:
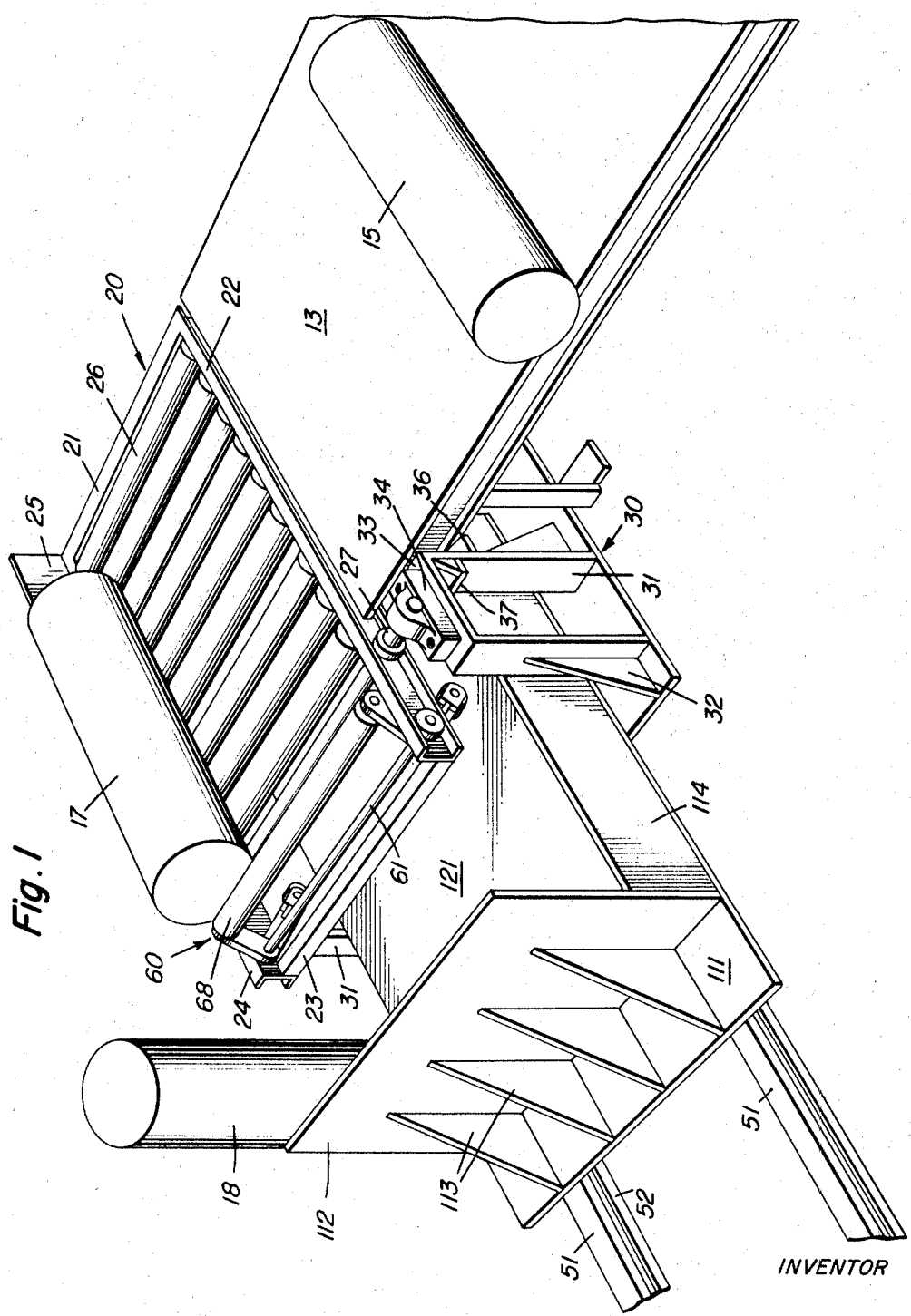
FIGURE 1 is a perspective view of a preferred embodiment of the article transfer machine that shows large counter rolls rolling down an inclined table onto the tiltable platform.

The preferred embodiment of the invention comprises platform support means 30, tiltable platform 20 that is rotatably attached to and supported by platform support means 30, platform tilt means 100 for tilting platform 20, counter-roll dump means 60 along the downwardly-tiltable side of platform 20, and a single-layer loading means that comprises dolly 110, rail and base means 50, and dolly positioning means 130.

The downwardly-tiltable side of platform 20 is hereinafter termed the dump side, and the opposite side is hereinafter termed the upper side. The side of platform 20 to which incoming articles are sequentially fed is herein termed the feed side. "Full tilt" for platform 20 is herein defined as 90° from horizontal, i.e., substantially vertical. The article-supporting surface of platform 20 must permit relatively frictionless movement of articles thereacross.

Figure 5:
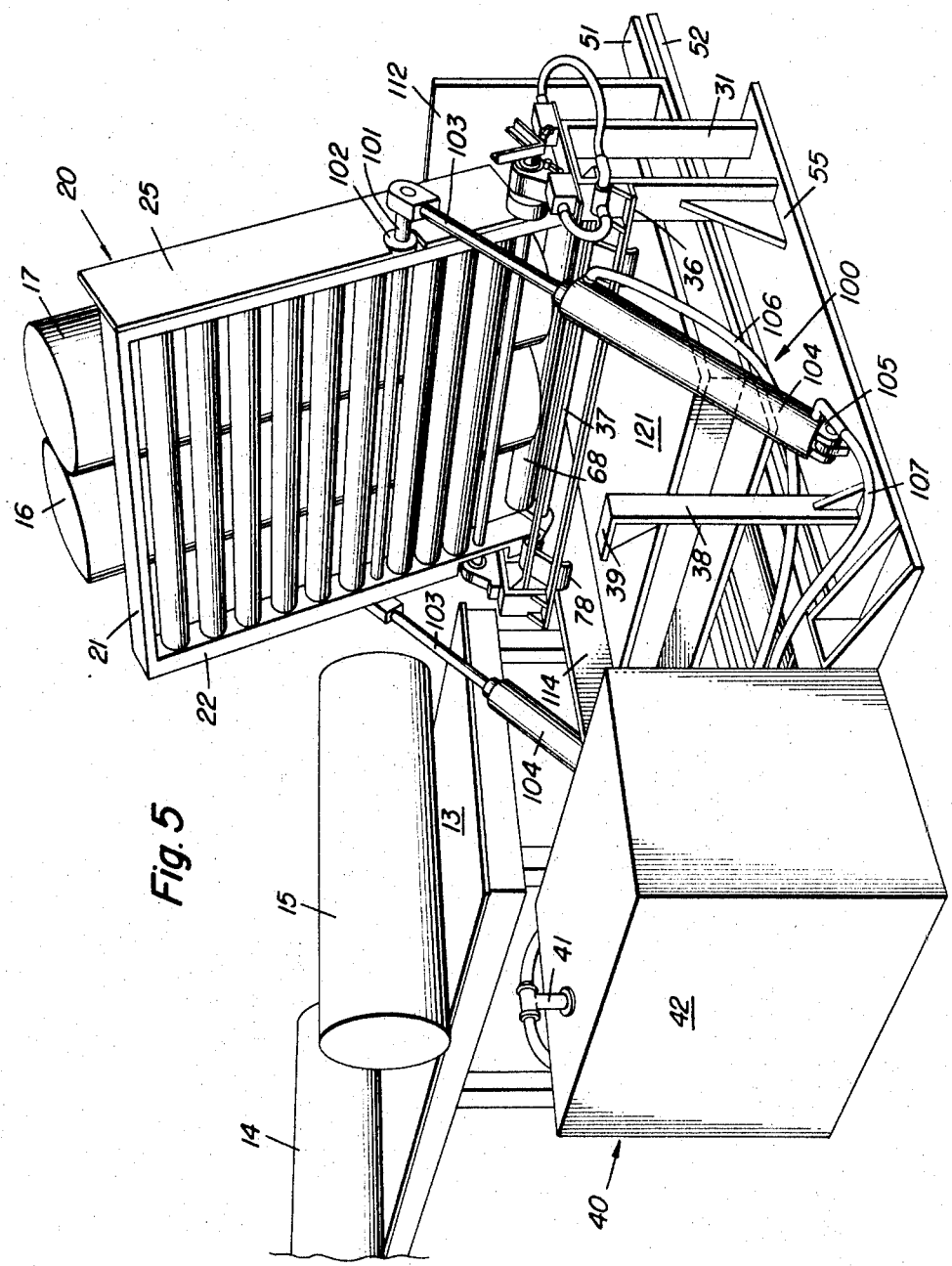
FIGURE 5 is a side view of the machine in cross section, looking in the direction of the arrows crossing the line in FIGURE 4, with two rows of large counter rolls on a pallet that has been added to the dolly
Figure 10:
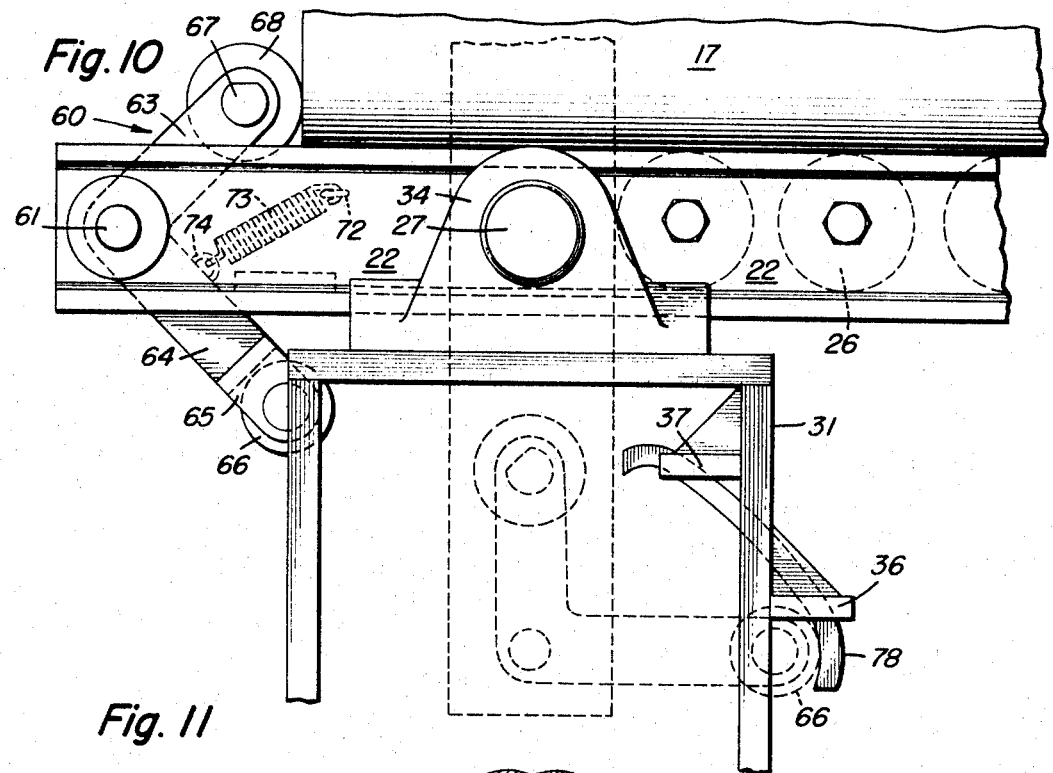
FIGURE 10 is a side detail view of the platform support means and counter-roll dump means.
Figure 11:
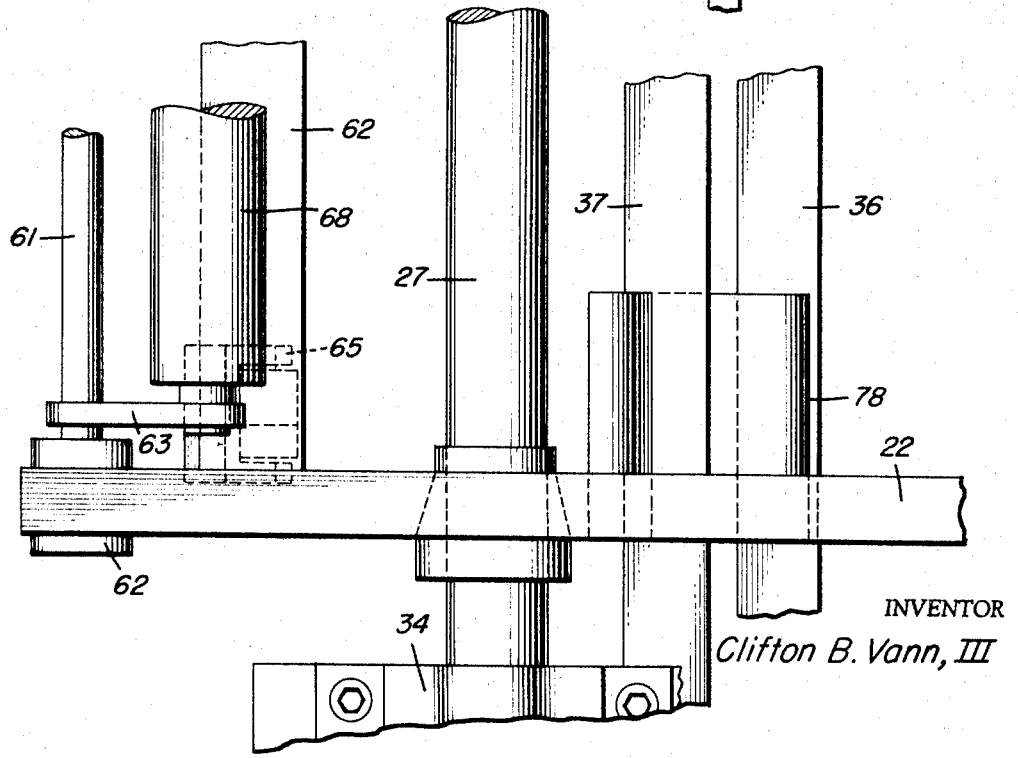
FIGURE 11 is a top detail view of the parts shown in FIGURE 10.

The platform support means 30 supports the tiltable platform 20, as seen most clearly in FIGURE 1. Upright members 31, braces 32, and shelf 33 support bearing block 34 on each side of tiltable platform 20. Bearing blocks 34 partially support tiltable platform 20 by means of platform tilt shaft 27 which passes rotatably through both bearing blocks 34. When platform 20 is horizontal, partial support is also given by the horizontal upper-end rest plates 39 and vertical upper-end supports 38, as shown in FIGURE 5.

Figure 2:
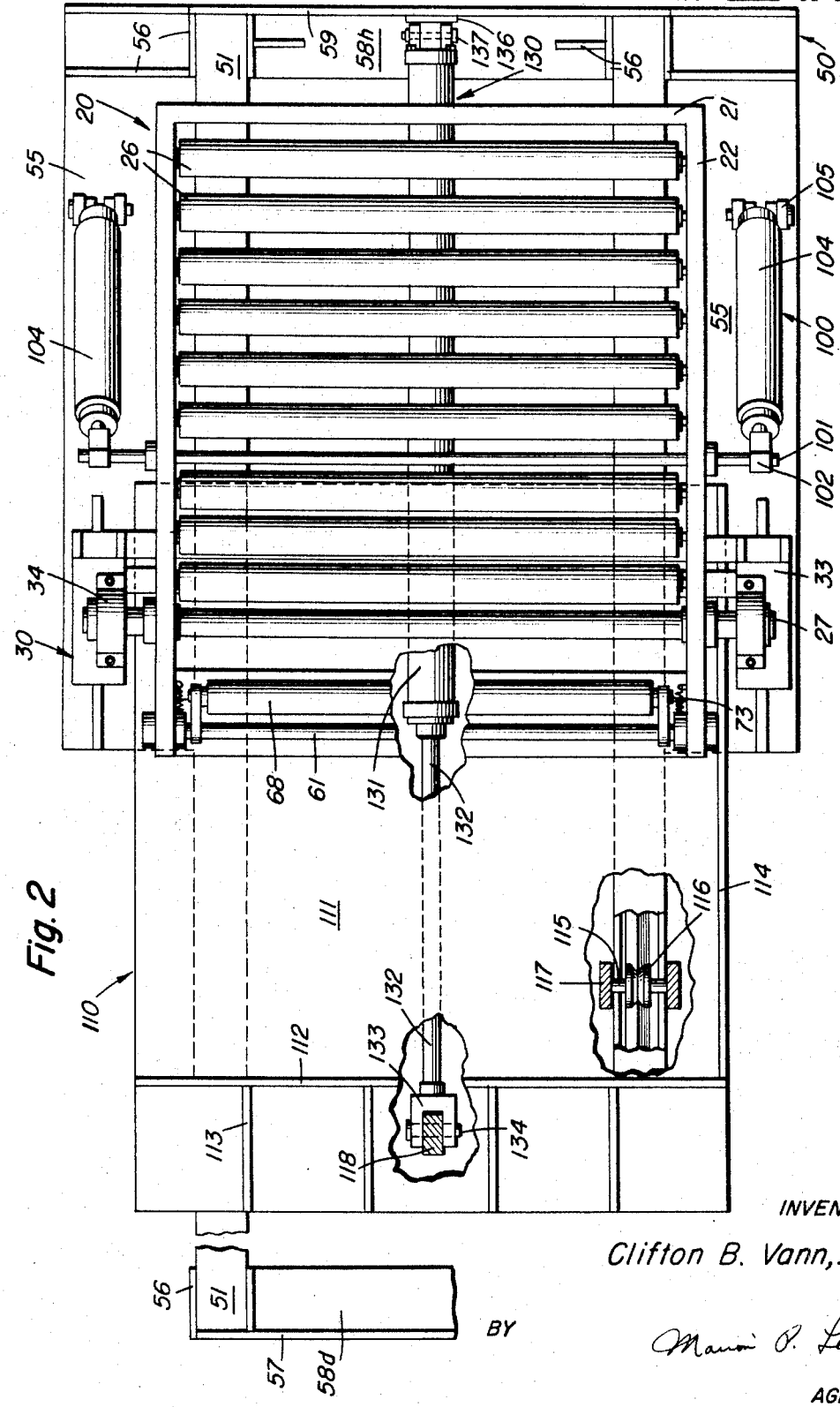
FIGURE 2 is a top view of the machine.

Tilt shaft 27, rotatably attached to bearing blocks 34, passes through lonigtudinal frame members 22, 24 and is rigidly attached thereto, as shown in FIGURES 1 and 2.

Cross frame members 21, 23 are rigidly attached to longitudinal members 22, 24 to form a rectangular frame having member 21 on the upper side and member 23 on the dump side. Alignment rolls 26 are rotatably attached at each end to longitudinal frame members 22, 24 so that the upper surfaces of alignment rolls 26 are slightly higher than the upper surfaces of frame members 21, 22, 23, 24. Border 25 is attached to longitudinal frame member 24; preferably, border 25 is slideably attached so that small lateral adjustments for counter roll diameter can be made.

Dump means 60 includes movable barrier roll 68, against which sequentially delivered articles such as counter rolls 16, 17 are aligned into a row and which increasingly becomes a bottom support for the row of articles as platform 20 is tilted, cam 78 which is rigidly attached to platform support means 30, and a barrier roll movement means that is attached to tiltable platform 20 and supports barrier roll 68. The barrier roll movement means interacts with cam 78 when tilting of platform 20 is approaching completion, whereby barrier roll 68 is removed completely and counter rolls 16, 17 drop endwise.

In the instant embodiment, counter rolls 14, 15 roll along inclined table 13 over longitudinal member 22 onto platform 20 and come to rest against border 25, sequentially accumulating as a row of approximately aligned counter rolls 16, 17. When platform 20 is tilted, rolls 16, 17 slide longitudinally and downwardly, transversely to their incoming direction, over rotatable alignment rolls 26 to form a precisely aligned row against barrier roll 68. When platform 20 is fully tilted, the row of counter rolls 16, 17 drops endwise upon pallet 120 to form rows 18, 19 of upended counter rolls.

However, counter rolls 14, 15 could be delivered endwise on a conveyor to the upper side of platform 20 past cross frame member 21 near its juncture with longitudinal frame member 22, with platform 20 slightly tilted toward side barrier 25 so that the incoming rolls would roll toward border 25 and be aligned thereagainst.

Barrier roll 68 is supported and controlled by the barrier roll movement means, comprising dump arms 63, 64, shaft 61, bracket 65, and rollers 66. Barrier roll 68 is rotatably attached at each end, by means of barrier roll shaft 67, to arm 63 of the angled dump arms 63, 64 that are rigidly attached to dump arm shaft 61 which is rotatably attached to longitudinal frame members 22, 24, as shown clearly in FIGURE 9. A U-shaped bracket 65 is attached to the end of each lower dump arm 64 and straddles a rotatably attached roller 66.

Rigidly attached to the more distant of the upright members 31 are outer transverse bar 36 and inner transverse bar 37. Partially intersecting these bars 36, 37 are concave cams 78 which are rigidly attached thereto, adjacent to an upright member 31.

Rollers 66 contact the upper part of concave cams 78 when platform 20 has been tilted through an angle of approximately 80° from its horizontal position. As platform 20 tilts through an additional 10°, rollers 66 roll downward to the other end of cams 78, thus rapidly revolving barrier roll 68 through an angle of about 45° until beyond the article-supporting surfaces of alignment rolls 26.

Rigidly attached to longitudinal frame members 22, 24 between arms 63, 64 is a dump arm stop plate 62 that limits revolving travel of arms 63, 64 on shaft 61 in either direction. Dump arm return spring 73 is attached to lower dump arm 64 with staple 74 and to longitudinal frame member 22 with staple 72, whereby dump arms 63, 64 are counter-revolved, lifting barrier roll 68 again into barrier position after platform 20 is revolved toward its horizontal position sufficiently for rollers 66 to be disengaged from cams 78.

Platform 20 is tilted by raising the upper side with platform tilt means 100, comprising tilt cylinder 104, bottom tilt cylinder swivel 105, tilt cylinder piston 103, tilt axle 101, tilt axle bearing 102, tilt cylinder return hose 106, and tilt cylinder lift hose 107. Swivel 105 is rigidly attached to base 55. Bearings 102 are rigidly attached to longitudinal frame members 22, 24, and axle 101 is freely rotatable within bearings 102.

As platform 20 is tilted or returned to horizontal position, tilt signal means 80 can be used for automatically slowing down and stopping the travel of tilt cylinder piston 103. Tilt signal means 80 comprises horizontal switch 81, horizontal tilt switch 82, switch cable 84, horizontal lever arm 85, vertical lever arm 86, vertical arm 87, and vertical tilt switch 88.

The rows of articles aligned against barrier roll 68, such as upended counter rolls 16 and 17, may be deposited upon a wide variety of receiving means, such as: (a) a conveyor belt moving transversely to the row of dropped articles, (b) a single-layer loading means which is capable of lateral movement, transversely to the row of dropped articles, whereby rows of dropped articles can be closely juxtaposed, and (c) a multi-layer loading means wherein a filled layer is sequentially dropped by the height of the layer of juxtaposed articles.

The preferred embodiment for counter rolls, which is shown in the drawings, utilizes a single-layer loading means for loading a wooden pallet 120 that is previously positioned upon dolly 110.

This single-layer loading means comprises dolly 110, rail and base means 50, and dolly positioning means 130. Dolly 110 can be selectively positioned beneath dump means 60 by dolly positioning means 130. Dolly 110 comprises a generally rectangular bed 111, backboard 112 which is rigidly attached to bed 111 and is parallel to barrier roll 68, backboard braces 113, sideboard 114, wheel support brackets 117 which are rigidly attached to bed 111, shafts 115 that are rotatably attached to brackets 117, wheels 116 which are centrally attached to shafts 115, and positioning bracket 118.

Dolly 110 rides on rail and base means 50. The rail structure thereof comprises upper rail plate 51, lower rail plate 52, upper rail 53, and lower rail 54, forming a double-track railway, as shown in FIGURE 6. Each rail is straddled by bracket 117, and each wheel 116 rides between rails 53, 54, as shown in the broken-away portion of FIGURE 2. The base structure thereof comprises side base plates 55, rail supports 56, discharge end plate 57, cross plates 58d and 58h, and hydraulic end plate 59. The side base plates 55 underlie support means 30 and platform tilt means 100. Cross plate 58h is rigidly and transversely attached to one end of these side base plates 55, and hydraulic end plate 59 is rigidly attached perpendicularly along one side of cross plate 58h. Cross plate 58d is rigidly attached to both lower rail plates 52. Rail supports 56 brace rail plates 51, 52 at each end thereof and are attached rigidly to plates 55, 57, 58h and 59.

Dolly positioning means 130 comprises positioning cylinder 131, cylinder shaft 132, shaft bracket 133, shaft pin 134, cylinder bracket 136, and cylinder pin 137. Cylinder bracket 136 is rigidly attached to end plate 59. Shaft bracket 133 is attached to the extended end of cylinder shaft 132 and engages dolly positioning bracket 118 with shaft pin 134.

Positioning cylinder 131 is supplied with hydraulic hoses which are not shown in the drawings. These hoses and tilt cylinder hoses 106, 107 are supplied with hydraulic fluid by hydraulic means 40, having hydraulic output line 41 and tank 42.

A typical wooden pallet 120 is conveniently positioned on dolly bed 111 so that one side thereof abuts backboard 112 and an adjacent side thereof abuts sideboard 114. Pallet 120 has base 121 and legs 122 attached thereto which are high enough for handling pallet 120 with a fork lift truck.

Figure 3:
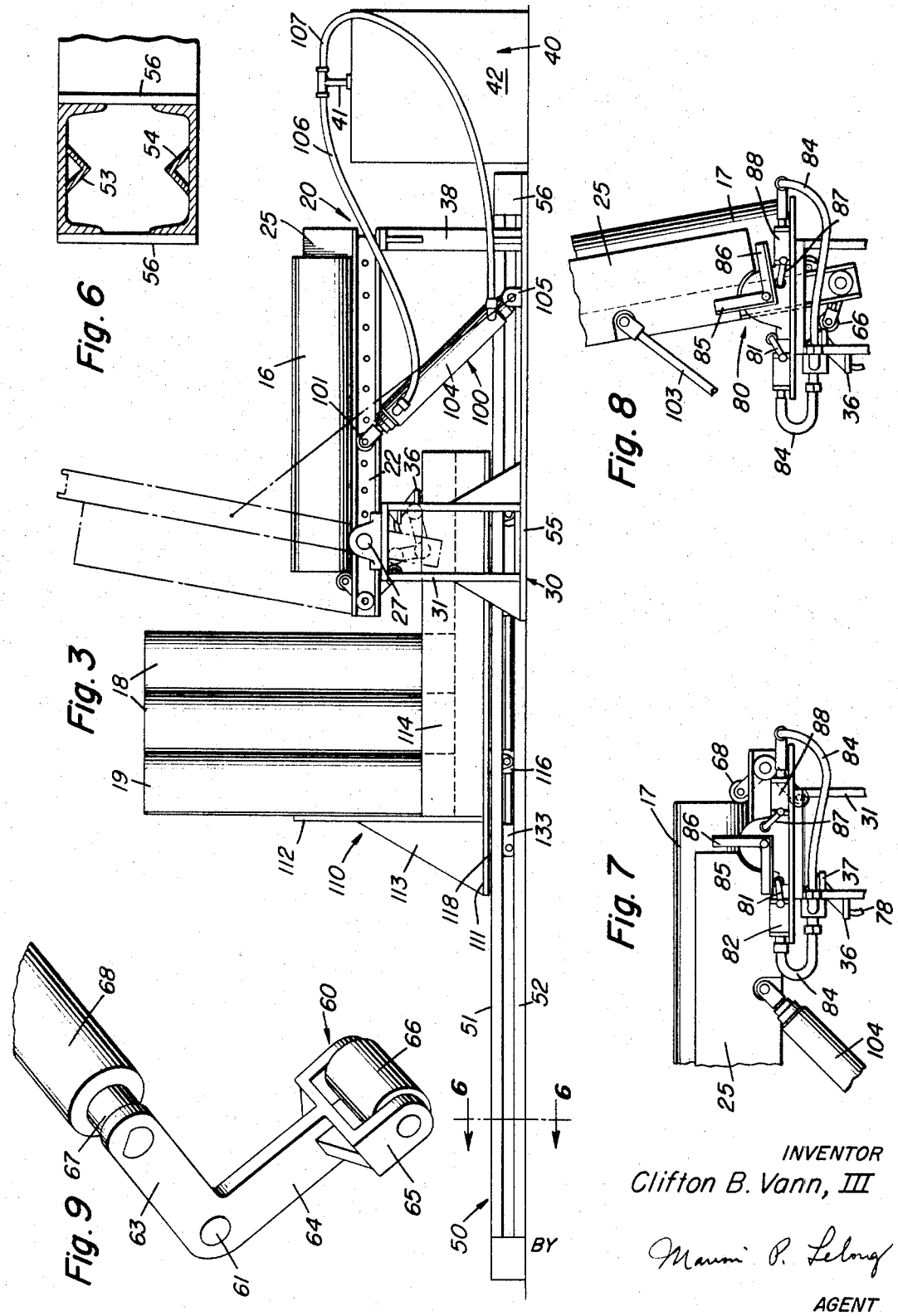
FIGURE 3 is a side view in elevation of the machine from the feed side.
Figure 4:
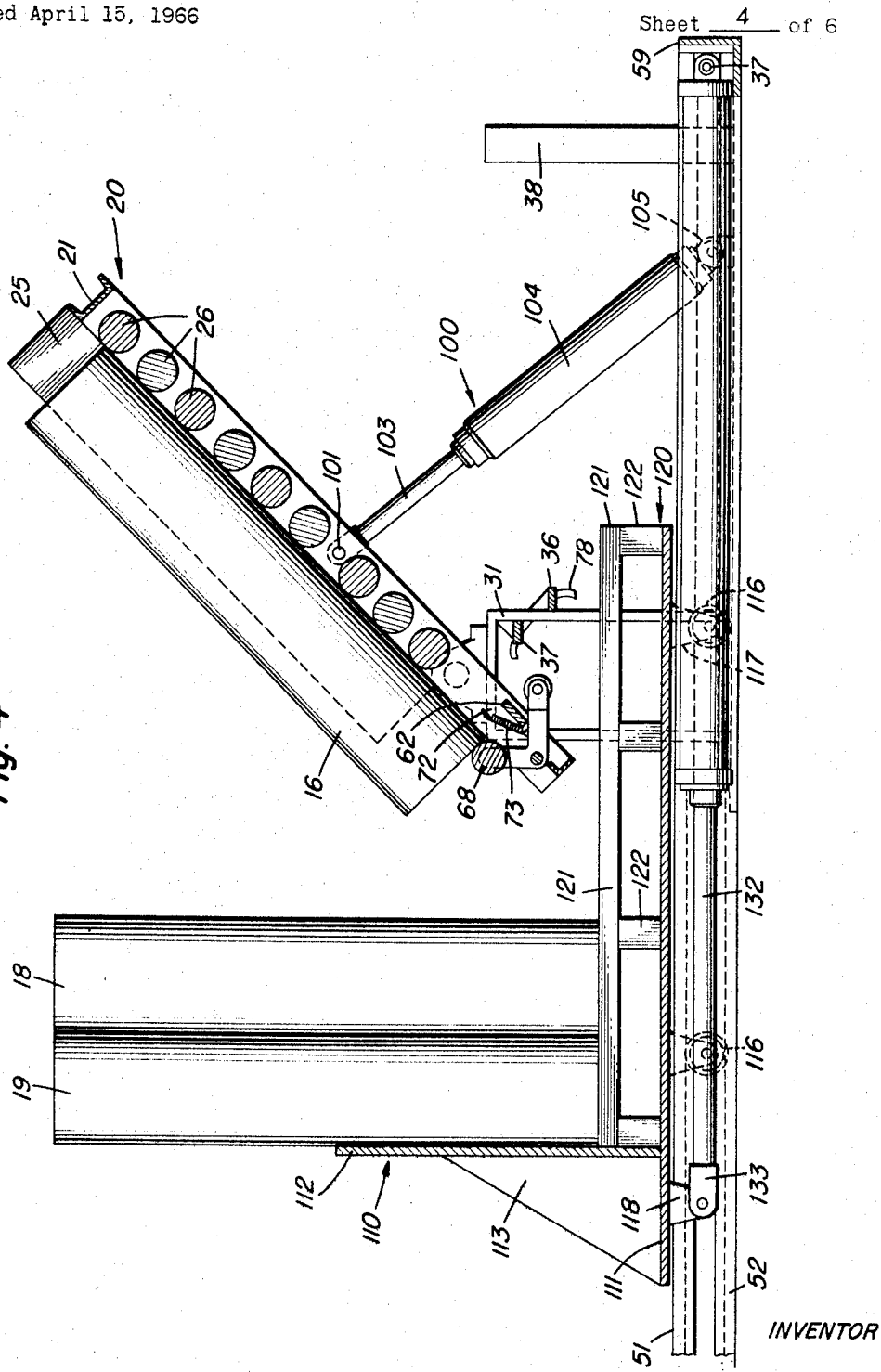
FIGURE 4 is a perspective view of the machine, with tiltable platform partially tilted, looking toward the dolly.

The embodiment of the invention that is described herein can be operated very satisfactorily with manual controls, particularly if the operator station is closely adjacent to counter-roll dump means 60 so that the operator can closely observe and estimate juxtaposition of counter rolls 16, 17 on tilted platform 20 against previously deposited row 18, as shown in FIGURE 3 where platform 20 and its contents are in phantom. With manual operation, tilt signal means 80 can be eliminated.

If small counter rolls are to be upended onto pallet 120, a double or triple layer can be loaded simultaneously by aligning two or three rows side-by-side on platform 20 and dropping all rows at once when platform 20 is fully tilted.

The barrier roll movement means revolves barrier roll 68 toward alignment rolls 26, as described hereinbefore, but, as indicated by the phantom portion of FIGURE 3, this arrangement necessitates dropping of the row of counter rolls or other articles through a great enough distance to cause a distinct shock to larger rolls. By locating cams 78 upwardly and toward dolly 110 so that rollers 66 initially contact its lower half instead of its upper half, dump arms 63, 64 can be made to revolve downwards. A hinged detent, attached to dump arm stop plate 62, can be spring loaded to retain dump arms 63, 64 in raised position until platform 20 is sufficiently tilted. At a desired angle, such as 80°, a trip finger that is attached to transverse bar 37 can release the detent just before engagement of rollers 66 with cams 78. Barrier roll 68 can thus be revolved downwards, past frame member 23, so that it barely clears the surface of pallet base 121.

Completely automatic operation can be achieved by adding an automatic operating means, comprising: an article thickness gage, a load calculator which computes the number of articles to be loaded on platform 20, a platform detector that is attached to the platform support means 30 (as on rest plate 39), a gate mounted on table 13 or on frame member 22, a gate opening-and-closing means that is actuated by the load calculator to block incoming articles on table 13, and a dolly positioning valve that is actuated by the article thickness gage to control flow of the hydraulic fluid to positioning cylinder 131.

I claim:
1. An article transfer machine for sequentially delivered articles, comprising:
 (a) a platform support means,
 (b) a tiltable platform, having an article-supporting surface and a dump side, that is rotatably attached to and supported by the platform support means, whereby a series of sequentially delivered articles can be accumulated in a row along the dump side,
 (c) a platform tilt means for tilting the platform from an approximately horizontal position to an approximately vertical position, and
 (d) an article dump means along the dump side of said platform, comprising:
  (1) a dump barrier, comprising a barrier roll, along said dump side that is sufficiently elevated above the article-supporting surface of said tiltable platform to become a bottom support for the row of accumulated articles as the tiltable platform is tilted toward its vertical position,
  (2) a cam that is rigidly attached to the platform support means, and
  (3) a dump barrier removal means, to which said dump barrier roll is rotatably attached, that interacts with the cam when the tiltable platform is tilted at an angle of approximately 80° and subsequently moves the dump barrier roll beyond the article-supporting surface whereby said articles drop vertically.

2. The article transfer machine of claim 1, wherein said dump barrier roll is revolvingly moved beyond the article-supporting surface of the tiltable platform while said tiltable platform is tilted through approximtaely 10° to its vertical position.

3. The article transfer machine of claim 2, wherein said dump barrier roll is caused to be moved by the cam in a direction opposite to the direction of tilting of said platform.

References Cited

UNITED STATES PATENTS

| | | |
|---|---|---|
| 2,723,792 | 11/1955 | Wetzel. |
| 2,828,031 | 3/1958 | Babcock et al. |
| 3,279,664 | 10/1966 | Lynch _____ 214—7 X |
| 3,289,859 | 12/1966 | Tarbox. |

GERALD M. FORLENZA, *Primary Examiner.*

R. J. SPAR, *Assistant Examiner.*

U.S. Cl. X.R.

214—7